(12) United States Patent
Park et al.

(10) Patent No.: US 8,548,095 B2
(45) Date of Patent: Oct. 1, 2013

(54) METHOD OF GENERATING CODEBOOK AND TRANSMITTING DATA IN A MULTI-INPUT MULTI-OUTPUT SYSTEM

(75) Inventors: Sungho Park, Gyeonggi-Do (KR); Binchul Ihm, Gyeonggi-Do (KR); Wookbong Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/321,523

(22) PCT Filed: Jun. 14, 2010

(86) PCT No.: PCT/KR2010/003804
§ 371 (c)(1),
(2), (4) Date: Nov. 18, 2011

(87) PCT Pub. No.: WO2010/143923
PCT Pub. Date: Dec. 16, 2010

(65) Prior Publication Data
US 2012/0069926 A1    Mar. 22, 2012

Related U.S. Application Data

(60) Provisional application No. 61/186,390, filed on Jun. 12, 2009.

(30) Foreign Application Priority Data

Feb. 12, 2010    (KR) .................. 10-2010-0013600

(51) Int. Cl.
*H04L 27/00*    (2006.01)
*H04L 27/28*    (2006.01)
*H04B 7/02*     (2006.01)

(52) U.S. Cl.
USPC ........... 375/299; 375/267; 375/260; 375/295; 375/259

(58) Field of Classification Search
USPC ......................................... 375/267, 260, 299
See application file for complete search history.

(56) References Cited

U.S. PATENT DOCUMENTS

2008/0225964 A1    9/2008    Han et al.
2009/0041150 A1*   2/2009    Tsai et al. .................. 375/267
2010/0215112 A1*   8/2010    Tsai et al. .................. 375/267

FOREIGN PATENT DOCUMENTS

KR    1020060038812    5/2006
KR    1020090052791    5/2009

OTHER PUBLICATIONS

Frenzel, Louis E., "Welcome to Antennas 101," Aug. 14, 2008, Electronic Design, pp. 1-5.*
Duman, Tolga M. et al., Coding for MIMO Communication Systems, 2007, John Wiley & Sons., Ltd., pp. 214-215.*
Oestges, Claude et al., MIMO Wireless Communications, 2007, Elsevier, pp. 319-321.*

* cited by examiner

*Primary Examiner* — Chieh M Fan
*Assistant Examiner* — Michelle M Koeth
(74) *Attorney, Agent, or Firm* — Lee, Hong, Degerman, Kang & Waimey

(57) ABSTRACT

A method for designing an optimized codebook in a multi-input multi-output communication method using various codebooks is disclosed. In particular, an optimized codebook with respect to eight transmission antennas is devised, and a method for effectively transmitting data by using the optimized codebook is disclosed.

3 Claims, 1 Drawing Sheet

METHOD OF GENERATING CODEBOOK AND TRANSMITTING DATA IN A MULTI-INPUT MULTI-OUTPUT SYSTEM

CROSS-REFERENCE TO RELATED APPLICATIONS

This application is the National Stage filing under 35 U.S.C. 371 International Application No. PCT/KR2010/003804, filed on Jun. 14, 2010, which claims the benefit of earlier filing date and right of priority to Korean Application Serial No. 10-2010-0013600, filed on Feb. 12, 2010, and also claims the benefit of U.S. Provisional Application Ser. No. 61/186,390, filed on Jun. 12, 2009, the contents of which are all incorporated by reference herein in their entirety.

TECHNICAL FIELD

The present invention relates to a multi-input multi-output (MIMO) scheme of a wireless communication system and, more particularly, to a method for generating a codebook with respect to eight transmission (8Tx) antennas and effectively transmitting data by using the generated codebook.

BACKGROUND ART

Recently, diverse researches on providing multiple multimedia services including a voice service and transmitting high speed data while maintaining high quality in a radio communication environment are being conducted. In particular, technique for a multi-input multi-output (MIMO) communication system using a plurality of channels in a spatial area is being rapidly developed.

First, a general MIMO technique will now be described.

In brief, a MIMO refers to a method for improving data transmission and reception efficiency by using multiple transmission antennas and multiple reception antennas, shedding a system in which a single transmission antenna and a single reception antenna are used. Namely, the MIMO refers to a technique of seeking an increase in the capacity of data transmission or improvement of performance by using multiple antennas at a transmission end or at a reception end of a wireless communication system.

A multi-input multi-output technique (or a multi-antenna technique) is an application of a technique of collecting data fragments received by multiple antennas for a completion, rather than relying on a single antenna path for receiving a single entire message. Accordingly, a data transmission rate can be improved or an application range of the system can be increased over a particular data transmission rate.

In the MIMO communication system, a base station and mobile stations use a codebook in order to properly cope with a channel environment. A particular space can be quantized to a plurality of codebooks, and a plurality of codewords generated by quantizing the space according to a certain reference can be stored in the base station and mobile stations. Here, each codeword may be a vector or a matrix depending on the dimension of a channel matrix.

Namely, each mobile station selects one matrix or vector corresponding to channel information from among matrixes or vectors included in the codebook according to a channel formed between the base station and each mobile station. Also, each base station can recognize channel information by receiving the matrix or vector selected by each mobile station by using the codebook. Also, the selected matrix or vector may be beamformed by the base station or may be used to transmit data by using multiple antennas. Thus, in the MIMO communication system, it is very important to properly design a codebook in order to effectively transmit data.

Thus, as mentioned above, how well a codebook is designed causes a big difference for a data transmission efficiency, an optimized codebook needs to be designed to effectively transmit data.

In general, a considered communication environment has various channel characteristics and frequency bands. However, in the related art, an antenna topology and configuration with respect to a base station or a mobile station are fixed, so although the same codebook is used, the same performance is not guaranteed according to the antenna topology and configuration of the base station and the mobile station, causing a problem in that the overall performance is degraded.

DISCLOSURE OF INVENTION

Solution to Problem

Therefore, in order to address the above matters, the various features described herein have been conceived.

An aspect of the present invention provides a method for designing a codebook for an effective data transmission in a multi-input multi-output system, and a method of transmitting multiple antennas using the same. In particular, an aspect of the present invention provides a method for selecting or configuring a codebook more suitable for a given environment based on more detailed information than those used in the related art in defining a codebook set. Also, another aspect of the present invention devises a method for designing a codebook with respect to eight transmission antennas and a method for effectively transmitting data by using the codebook.

According to an aspect of the present invention, there is provided a method for configuring a codebook in a multi-input multi-output system, including: receiving information related to a configuration of a codebook from a transmission end; and configuring a codebook based on the received information.

The information related to the configuration of the codebook may include at least one of an antenna topology, a center frequency, an antenna spacing, an antenna distance, coordinates of antenna elements, number of antennas, an antenna type, and a slant angle.

The antenna topology may be classified into a uniform linear array (ULA) and a uniform circular array (UCA).

The antenna type may be classified into a dipole antenna, a patch array antenna, and a dual polarized antenna.

The information related to the configuration of the codebook may be an index of a pre-set multi-codebook.

The pre-set multi-codebook may include an antenna topology and configuration, a center frequency, an antenna spacing, an antenna distance, coordinates of antenna elements, number of sectors per cell, a codebook size, and a slant angle.

According to an exemplary embodiment of the present invention, an optimized codebook can be designed according to an antenna topology and configuration of a base station and mobile stations and used for a data transmission, thus improving the efficiency of a data transmission.

The foregoing and other objects, features, aspects and advantages of the present invention will become more apparent from the following detailed description of the present invention when taken in conjunction with the accompanying drawings.

MODE FOR THE INVENTION

Figure 1:
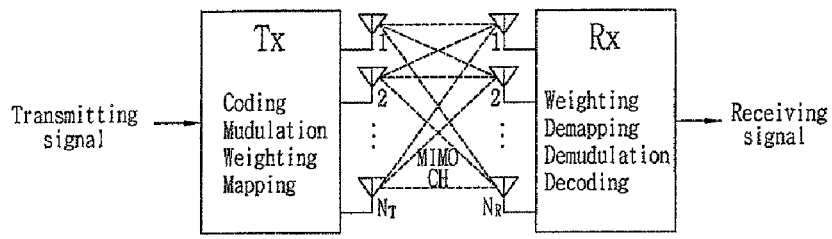
FIG. 1 illustrates a multi-input multi-output (MIMO) communication system to which the related art and the present invention are applied.

One aspect of this disclosure relates to the recognition by the present inventors about the problems of the related art as described above, and further explained hereafter. Based upon this recognition, the features of this disclosure have been developed.

The present invention proposes a method for configuring a codebook in a multi-input multi-output (MIMO) system in order to enhance the efficiency of a data transmission compared with the related art, which includes: receiving information related to a configuration of a codebook from a transmission end (a mobile station or a base station); and configuring a codebook based on the received information. Also, the present invention proposes a wireless mobile communication mobile station or a base station that can carry out the method.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

The exemplary embodiments of the present invention described hereinafter can be applicable to a multi-carrier multi-access system in consideration of mobility of a mobile station, for example a mobile communication system using OFDM. Also, the exemplary embodiments of the present invention can be applicable to MC (Multi carrier)-CDMA, SC (Single carrier)-FDMA, WH (Walsh-Hadamard)-FDMS, DFT (Discrete Fourier Transform) spread OFDMA.

Also, the technical features of the present invention described hereinafter, which can be applicable to an E-UMTS (Evolved Universal Mobile Telecommunications System) also called an LTE (Long Term Evolution), is obviously applicable to other similar mobile communication system such as IEEE 802.16m, a WiBro system, and the like.

The E-UMTS system has been evolved from the existing WCDMA UMTS system, and currently, 3GPP (3$^{rd}$ Generation Partnership Project) performs basic standardization operation of the E-UMTS system. Details of the technical specification of the UMTS and the E-UMTS can be referred to Release 7 and Release 8 of "3rd Generation Partnership Project; Technical Specification Group Radio Access Network".

In some cases, a known structure and/or device may be omitted to avoid an ambiguous concept, and the present invention may be represented by a block diagram and/or flow chart based on a core function of each structure and/or device.

In general, a communication system is widely disposed to provide various communication services such as voice, packet data, and the like. This technique may be used for downlink or uplink. Downlink refers to communication from a base station to a mobile station, and uplink refers to communication from the mobile station to the base station. In general, the base station is a fixed point communicating with the mobile station and includes a network excluding the mobile station in the communication system including an upper layer as well as a physical transmission stage. Thus, in an exemplary embodiment of the present invention, the network and the base station are parts symmetrical to the mobile station, having the same meaning. Here, the mobile station may be fixed or have mobility.

FIG. 1 is a view showing the configuration of a multi-antenna system (or a multi-input multi-output (MIMO) communication system) to which the related art and the present invention are applied.

As shown in FIG. 1, when the number of transmission antennas is increased to NT number and the number of reception antennas is increased to NR number, simultaneously, a theoretical channel transmission capacity can be increased in proportion to the number of antennas, so a transmission rate and a frequency efficiency can be drastically improved. Namely, for example, in a MIMO communication system using four transmission antennas and four reception antennas, theoretically, four-fold transmission rate can be obtained compared with a single antenna system.

The multi-antenna technique may be divided into a spatial diversity scheme having an enhanced transmission reliability by using symbols that have passed through various channel paths and a spatial multiplexing scheme for improving a transmission rate by simultaneously transmitting a plurality of data symbols by using multiple transmission antennas. Also, a method of suitably combining the two schemes and taking the advantage of both schemes may be also used.

Figure 2:
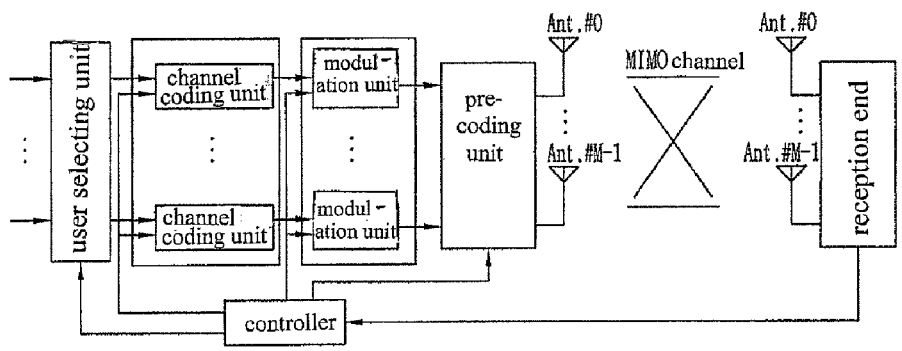
FIG. 2 is a schematic block diagram showing the configuration of a transmission end and a reception end of a codebook-based MIMO system according to an exemplary embodiment of the present invention.

FIG. 2 is a schematic block diagram showing the configuration of a transmission end and a reception end of a codebook-based MIMO system according to an exemplary embodiment of the present invention.

First, a transmission end of FIG. 2 may be a base station or a mobile station. As illustrated in FIG. 2, as for user data to be transmitted from the transmission end to a reception end, a single data stream or one of multiple data streams is selected by a user selecting unit and inputted to a channel coding unit. Thereafter, the channel coding performs channel coding. Also, a modulation unit performs constellation mapping on the channel-coded user data, the symbolized user data are multiplied by a precoding matrix in a precoding unit, and then transmitted to each antenna. In the example illustrated in FIG. 2, a multi-antenna system is assumed to have M number of antennas in the transmission end and M number of antennas in the reception end.

The user data transmitted through the antennas of the transmission end is input to the antennas of the reception end through a radio channel. The reception end may recognize a channel status and transmit feedback information including an optimum codebook index, namely, a precoding matrix index (PMI), to the transmission end. Then, the precoding unit of the transmission end may receive the feedback codebook index through a controller and apply a precoding matrix corresponding to the feedback codebook index to the user data. The feedback information may further include a channel quality indicator (CQI) or the like, and the controller may perform selecting on a user or optimum precoding matrixes by using the feedback information from the reception end and inform the precoding unit accordingly.

As discussed above, the present invention devises, especially, a codebook with respect to eight transmission (8Tx) antennas and provides a method for effectively transmitting data by using the codebook.

In designing a codebook with respect to the multiple antennas, a proper codebook must be devised in consideration of the following matters. First, in designing a codebook, every inter-channel condition must be considered and a codebook for an extensive range of channel conditions must be devised. Also, the codebook must be devised such that a codeword selection complexity is reduced in its designing in consideration of a low codeword search complexity. Also, in designing the codebook, the codebook must be devised to have a low power imbalance in consideration of power imbalance. Finally, the codebook must be devised to have a low feedback overload.

Figure 3:
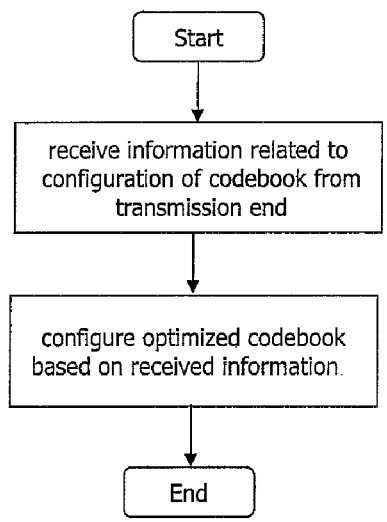
FIG. 3 is a flow chart illustrating the process of a method for designing a codebook in a MIMO system.

FIG. 3 is a flow chart illustrating the process of a method for designing a codebook in a MIMO system.

As illustrated in FIG. 3, the reception end (i.e., a base station or a mobile station) may receive information related to the configuration of a codebook from the transmission end (i.e., a mobile station or a base station). Thereafter, the reception end may configure an optimized codebook based on the received information and use it for a data transmission.

A detailed procedure and process according to the present invention can be explained as follows.

A codebook in a system having eight transmission antennas currently discussed in IEEE802.16m is configured by using the following three basic matrixes.

Among them, the first two Rank 8×8 matrixes (Equation 1 and Equation 2) are used for transmission of Ranks 2 to 8 in an SU-MIMO (Single User-MIMO), and the third matrix (Equation 3) is used to transmit Rank 1 in a MU-MIMO (Multi-User-MIMO). Here, the SU-MIMO is a scheme in which a single user is allocated all the antenna resources of a base station. Each user is allocated resource only by a single base station. Meanwhile, the MU-MIMO is a scheme in which each of base stations distributedly allocate antenna resources or radio space resources to a plurality of users. In the third matrix (Equation 3), $\theta_j$ is $$\theta_j = ((j-1) + 1/2) \times \frac{\pi}{24} - \frac{\pi}{3} \quad j = 1, \ldots, 16.$$

[Equation 1]

$$V8(:,:,1) = \frac{1}{\sqrt{8}} H_{1,1,3}(1,3,2,4) = \frac{1}{\sqrt{8}} \begin{bmatrix} 1 & 1 & 1 & 1 & 1 & 1 & 1 & 1 \\ 1 & -1 & j & -j & \frac{(1+j)}{\sqrt{2}} & -\frac{(1+j)}{\sqrt{2}} & \frac{(-1+j)}{\sqrt{2}} & -\frac{(-1+j)}{\sqrt{2}} \\ 1 & 1 & -1 & -1 & j & j & -j & -j \\ 1 & -1 & -j & j & \frac{(-1+j)}{\sqrt{2}} & -\frac{(-1+j)}{\sqrt{2}} & \frac{(1+j)}{\sqrt{2}} & -\frac{(1+j)}{\sqrt{2}} \\ 1 & 1 & 1 & 1 & -1 & -1 & -1 & -1 \\ 1 & -1 & j & -j & -\frac{(1+j)}{\sqrt{2}} & \frac{(1+j)}{\sqrt{2}} & -\frac{(-1+j)}{\sqrt{2}} & \frac{(-1+j)}{\sqrt{2}} \\ 1 & 1 & -1 & -1 & -j & -j & j & j \\ 1 & -1 & -j & j & -\frac{(-1+j)}{\sqrt{2}} & \frac{(-1+j)}{\sqrt{2}} & -\frac{(1+j)}{\sqrt{2}} & \frac{(1+j)}{\sqrt{2}} \end{bmatrix}$$

[Equation 2]

$$V8(:,:,2) = \frac{1}{\sqrt{8}} H_{3,2,4}(1,3,2,4) =$$

$$\frac{1}{\sqrt{8}} \begin{bmatrix} 1 & 1 & 1 & 1 & 1 & 1 & 1 & 1 \\ 1 & -1 & j & -j & \frac{(1+j)}{\sqrt{2}} & -\frac{(1+j)}{\sqrt{2}} & \frac{(-1+j)}{\sqrt{2}} & -\frac{(-1+j)}{\sqrt{2}} \\ \frac{(1+j)}{\sqrt{2}} & \frac{(1+j)}{\sqrt{2}} & -\frac{(1+j)}{\sqrt{2}} & -\frac{(1+j)}{\sqrt{2}} & \frac{(-1+j)}{\sqrt{2}} & \frac{(-1+j)}{\sqrt{2}} & -\frac{(-1+j)}{\sqrt{2}} & -\frac{(-1+j)}{\sqrt{2}} \\ \frac{(1+j)}{\sqrt{2}} & -\frac{(1+j)}{\sqrt{2}} & -\frac{(-1+j)}{\sqrt{2}} & \frac{(-1+j)}{\sqrt{2}} & -1 & 1 & j & -j \\ j & j & j & j & -j & -j & -j & -j \\ j & -j & -1 & 1 & -\frac{(-1+j)}{\sqrt{2}} & \frac{(-1+j)}{\sqrt{2}} & \frac{(1+j)}{\sqrt{2}} & -\frac{(1+j)}{\sqrt{2}} \\ \frac{(-1+j)}{\sqrt{2}} & \frac{(-1+j)}{\sqrt{2}} & -\frac{(-1+j)}{\sqrt{2}} & -\frac{(-1+j)}{\sqrt{2}} & \frac{(1+j)}{\sqrt{2}} & \frac{(1+j)}{\sqrt{2}} & -\frac{(1+j)}{\sqrt{2}} & -\frac{(1+j)}{\sqrt{2}} \\ \frac{(-1+j)}{\sqrt{2}} & -\frac{(-1+j)}{\sqrt{2}} & \frac{(1+j)}{\sqrt{2}} & -\frac{(1+j)}{\sqrt{2}} & j & -j & 1 & -1 \end{bmatrix}$$

[Equation 3]

$$V8(:,j,3) = \frac{1}{\sqrt{8}} \begin{bmatrix} 1 \\ e^{j\pi\sin(\theta_j)} \\ e^{j2\pi\sin(\theta_j)} \\ e^{j3\pi\sin(\theta_j)} \\ e^{j4\pi\sin(\theta_j)} \\ e^{j5\pi\sin(\theta_j)} \\ e^{j6\pi\sin(\theta_j)} \\ e^{j7\pi\sin(\theta_j)} \end{bmatrix}$$

The Rank 1 Codebook currently applied to IEEE802.16m is expressed as an array factor with respect to eight antenna elements, which is generalized by Equation 4 shown below:

$$AF = e^{j2\pi d \sin \theta / \lambda},\qquad\text{[Equation 4]}$$

where d=antenna distance between reference antenna element $$\lambda = \frac{C}{f_c}\ (C \approx 3\times 10^8,\ f_c: centerfrency(\text{Hz}))$$

In Equation 4, 'd' is an antenna distance between critical antenna elements.

If the antenna spacing, a fixed value, in Equation 5 is assumed to be 0.5, Equation 5 is the same as Equation 3 used for transmission or Rank 1 in the MU-MIMO.

A generally considered communication environment may have various channel characteristics and frequency bands, and ITU-R (International Telecommunication Union-Radio communication sector) defines representative five scenarios to verify the performance of RIT/SRIT (Radio Interface Technology/Set of RIT) based on them.

Table 1 below shows the representative five cell scenarios defined by ITU-R and basic assumptions with respect to the five cell scenarios.

Table 1

TABLE 1

| Baseline evaluation configuratin parameters | | | | | |
|---|---|---|---|---|---|
| Deployment scenario for the evaluation process | Indoorhotspot | Urbanmicro-cell | Urbanmicro-cell | Rural macro-cell | Suburbanmicro-cell |
| Base station (BS )antenna height | 6 m, mounted on ceiling | 10 m, belowrooftop | 20 m, aboverooftop | 35 m, aboverooftop | 35 m, aboverooftop |
| Number of BSantenna elements[1] | Up to 8 rxUp to 8 tx | Up to 8 rxUp to 8 tx | Up to 8 rxUp to 8 tx | Up to 8 rxUp to 8 tx | Up to 8 rxUp to 8 tx |
| Total BStransmit power | 24 dBm for 40 MHz, 21 dBm for 20 MHz | 41 dBm for 10 MHz, 44 dBm for 20 MHz | 46 dBm for 10 MHz, 49 dBm for 20 MHz | 46 dBm for 10 MHz, 49 dBm for 20 MHz | 46 dBm for 10 MHz, 49 dBm for 20 MHz |
| User terminal (UT) power class | 21 dBm | 24 dBm | 24 dBm | 24 dBm | 24 dBm |
| UT antenna system[1] | Up to 2 txUp to 2 rx | Up to 2 txUp to 2 rx | Up to 2 txUp to 2 rx | Up to 2 txUp to 2 rx | Up to 2 txUp to 2 rx |
| Minimum distance between UTand serving cell[2] | >=3 m | >=10 m | >=25 m | >=35 m | >=35 m |
| Carrier frequency (CF) for evaluation (representative of IMT bands) | 3.4 GHz | 2.5 GHz | 2 GHz | 800 MHz | Same asurban micro-cell |
| Outdoor to indoor-building penetration loss | N.A. | See Annex 1, Table A1-1 | N.A | N.A | 20 dB |
| Outdoor to incarpenetration loss | N.A | N.A | 9 dB(LN, 0 = 5 dB) | 9 dB(LN, 0 = 5 dB) | 9 dB(LN, 0 = 5 dB) |

[1]The number of antennas specified by proponent in the technology description-template (§4.2.3 of Report ITU_R M.2133) should be used in the evaluations. The numbers shall be within the indicated ranges in this table.
[2]In the horizontal plane.

When Equation 4 is mapped to $V_8(:,j,3)$, Equation 5 shown below is obtained:

$$V8(:,j,3) = \frac{1}{\sqrt{8}}\begin{bmatrix} e^{j2\pi 0 \Delta d \sin(\theta_j)/\lambda} \\ e^{j2\pi 1 \Delta d \sin(\theta_j)/\lambda} \\ e^{j2\pi 2 \Delta d \sin(\theta_j)/\lambda} \\ e^{j2\pi 3 \Delta d \sin(\theta_j)/\lambda} \\ e^{j2\pi 4 \Delta d \sin(\theta_j)/\lambda} \\ e^{j2\pi 5 \Delta d \sin(\theta_j)/\lambda} \\ e^{j2\pi 6 \Delta d \sin(\theta_j)/\lambda} \\ e^{j2\pi 7 \Delta d \sin(\theta_j)/\lambda} \end{bmatrix},\text{ where }\qquad\text{[Equation 5]}$$

$\Delta d$: antenna spacing in meter

In Equation 5, $\Delta d$ is an antenna spacing indicated in meter.

and bandwidth, and each base station may have a different antenna configuration and number of antennas.

An antenna topology will now be described. In general, a uniform linear array (ULA) and a uniform circular array (UCA) are commonly used antenna topologies. These topologies feature that antenna elements are disposed at the same spacing, so that channel characteristics affecting each antenna can be similar. However, for a particular purpose, although the antenna elements may be maintained at the same spacing in the antenna group, antennas between antenna groups may be disposed at a different antenna spacing or the respective antennas may be disposed at a different antenna spacing.

An antenna type will now be described. In general, numerous systems assume dipole antenna which is easily modeled basically. However, in implementing an actual system, various antenna types such as a patch array antenna for array beamforming, a dual polarized antenna for obtaining polarized diversity, and the like, can be taken into consideration.

A generalized antenna array based on a codebook will now be described. In case of the existing eight transmission (Tx) Rank 1 codebook, the antenna spacing is 0.5λ and obtains the best performance when the uniform linear array (ULA) is assumed. This is because the codebook is basically configured by using an array factor of the ULA and, in particular, it is configured with a value when the antenna spacing is fixed to be 0.5λ.

In general, the antenna topology and configuration with respect to the base station (BS) or a mobile station (MS) are fixed, so although the same codebook is in use, the same performance is not guaranteed depending on the antenna topology and configuration of the base station and the mobile station. For example, assuming that an antenna distance is 7.5 cm, the antenna spacing is 0.5λ when a center frequency is 2 GHz, but the antenna spacing is 0.875λ when the center frequency is 3.5 GHz, showing different influences. Reversely, assuming that the antenna spacing is 0.5λ, the antenna distance is 7.5 cm when the center frequency is 2 GHz, but the antenna distance is 4.2 cm when the center frequency is 3.5 GHz, showing different lengths.

Thus, the present invention proposes a method for configuring a suitable codebook according to each antenna topology and configuration by generating them.

Equation 6 below shows a codebook applied when the antenna topology is ULA.

$$CB_k = \frac{1}{\sqrt{K}} e^{j2\pi f_c (k-1)\Delta d \sin(\theta_i)/C} \quad \text{[Equation 6]}$$

where,
  $f_c$: centerfrequency (Hz)
  k: antenna index (k=1, ..., K)
  Δd: antenna spacing (meter)
  $\theta_i$: quantized angle in beam domain (i: selected beam index)

A codebook matrix with respect to Equation 6 can be represented by Equation 7 shown below:

$$8Tx \text{ Rank1 Codebook } V8(:,j,3) = \frac{1}{\sqrt{K}} \begin{bmatrix} 1 \\ e^{j2\pi\Delta d\sin(\theta_i)} \\ e^{j4\pi\Delta d\sin(\theta_i)} \\ e^{j6\pi\Delta d\sin(\theta_i)} \\ e^{j8\pi\Delta d\sin(\theta_i)} \\ e^{j10\pi\Delta d\sin(\theta_i)} \\ e^{j12\pi\Delta d\sin(\theta_i)} \\ e^{j14\pi\Delta d\sin(\theta_i)} \end{bmatrix} \quad \text{[Equation 7]}$$

When Equation 6 is extended to a case with respect to a polarization antenna, Equation 8 shown below is obtained:

$$CB_k = \frac{1}{\sqrt{K}} (\cos(\alpha_{tx}) + \sin(\alpha_{tx})\cos(\theta_i)) e^{j2\pi f_c(k-1)\Delta d\sin(\theta_i)/C} \quad \text{[Equation 8]}$$

where,
  $f_c$: centerfrequency (Hz)
  k: antenna index (k=1, ..., K)
  Δd: antenna spacing (meter)
    (if the cross polarization antenna is adopted, the spacing means distance between different antenna spots)
  $\alpha_{tx}$: antenna slant angle (e.g. 0°, 45°, −45°, 90°)
  $\theta_i$: quantized angle in beam domain (i: selected beam index)

A codebook matrix with respect to Equation 8 can be represented by Equation 9 shown below:

$$8Tx \text{ Rank1 Codebook } V8(:,j,3) = \frac{1}{\sqrt{K}} \begin{bmatrix} 1 \\ (\cos(\alpha_{tx}) + \sin(\alpha_{tx})\cos(\theta_i))e^{j2\pi\Delta d\sin(\theta_i)} \\ (\cos(\alpha_{tx}) + \sin(\alpha_{tx})\cos(\theta_i))e^{j4\pi\Delta d\sin(\theta_i)} \\ (\cos(\alpha_{tx}) + \sin(\alpha_{tx})\cos(\theta_i))e^{j6\pi\Delta d\sin(\theta_i)} \\ (\cos(\alpha_{tx}) + \sin(\alpha_{tx})\cos(\theta_i))e^{j8\pi\Delta d\sin(\theta_i)} \\ (\cos(\alpha_{tx}) + \sin(\alpha_{tx})\cos(\theta_i))e^{j10\pi\Delta d\sin(\theta_i)} \\ (\cos(\alpha_{tx}) + \sin(\alpha_{tx})\cos(\theta_i))e^{j12\pi\Delta d\sin(\theta_i)} \\ (\cos(\alpha_{tx}) + \sin(\alpha_{tx})\cos(\theta_i))e^{j14\pi\Delta d\sin(\theta_i)} \end{bmatrix} \quad \text{[Equation 9]}$$

In Equation 6 and Equation 8, the resolution of quantization with respect to a beam angle can be determined in the aspect of performance and feedback overhead. Also, an angle range with respect to quantization can be affected by a sectorization range. The reason is because, the basis of the codebook follows the characteristics of stearing vector (or AF), so the codebook is configured based on the value with respect to a beam angle. Equation 10 below shows a generalized form when quantization is performed at the same intervals on sectorization and codebook size.

$$\theta_i = \left((i-1) + \frac{1}{2}\right) * \left(\frac{2\pi}{N \cdot S}\right) - \left(\frac{2\pi}{2S}\right) \quad \text{[Equation 10]}$$

where,
  i: codebook index (or beam index, i=1, ..., N)
  S: Number of sectors

In Equation 10, on the assumption of 3-sectorization (S=3), a quantized angle with respect to 3-bit codebook can be represented by Equation 11 shown below, and a quantized angle with respect to a 4-bit codebook can be represented by Equation 12 shown below:

$$\theta_i = \left((i-1) + \frac{1}{2}\right) * \left(\frac{\pi}{24}\right) - \left(\frac{\pi}{3}\right) \quad \text{[Equation 11]}$$

where, i: codebook index (or beam index, i=1, ..., 16)

$$\Rightarrow \theta = \begin{cases} -0.9817, -0.8508, -0.7199, -0.5890, \\ -0.4581, -0.3272, -0.1963, -0.0654, \\ 0.06544, 0.19634, 0.32724, 0.45814, \\ 0.58904, 0.71994, 0.85084, 0.98174 \end{cases} \quad \text{[Equation 12]}$$

$$\theta_i = \left((i-1) + \frac{1}{2}\right) * \left(\frac{\pi}{24}\right) - \left(\frac{\pi}{3}\right)$$

where, i: codebook index (or beam index, i=1, ..., 16)

$$\Rightarrow \theta = \begin{cases} -0.9817, -0.8508, -0.7199, -0.5890, \\ -0.4581, -0.3272, -0.1963, -0.0654, \\ 0.06544, 0.19634, 0.32724, 0.45814, \\ 0.58904, 0.71994, 0.85084, 0.98174 \end{cases}$$

Likewise, in Equation 10, on the assumption of 6-sectorization (S=6), a quantized angle with respect to 3-bit codebook can be represented by Equation 13 shown below, and a quantized angle with respect to 4-bit codebook can be represented by Equation 14 shown below:

$$\theta_i = \left((i-1) + \frac{1}{2}\right) * \left(\frac{\pi}{24}\right) - \left(\frac{\pi}{6}\right) \quad \text{[Equation 13]}$$

where, i: codebook index (or beam index, i=1, ..., 8)
$\Rightarrow \theta = \{-0.4581, -0.3272, -0.1963, -0.0654, 0.06544, 0.19634, 0.32724, 0.45814\}$ $$\theta_i = \left((i-1) + \frac{1}{2}\right) * \left(\frac{\pi}{48}\right) - \left(\frac{\pi}{6}\right) \quad \text{[Equation 14]}$$

where, i: codebook index (or beam index, i=1, ..., 16)

$$\Rightarrow \theta = \begin{cases} -0.4909, -0.4254, -0.3600, -0.2945, \\ -0.2291, -0.1636, -0.0982, -0.0327, \\ 0.03272, 0.0982, 0.1636, 0.2291, \\ 0.2945, 0.3600, 0.4254, 0.4909 \end{cases}$$

So far, the codebooks applied when the antenna topology is ULA have been described.

If the antenna topology is the UCA, the antenna distance $d_k = (k-1)\Delta d$ in Equation 6 and Equation 8 is corrected to be represented by Equation 15 shown below so as to be applied:

$$d'_k = \frac{\sqrt{x_k^2 + y_k^2} \cos(\arctan(y_k/x_k) - \theta_i)}{\sin(\theta_i)} \quad \text{[Equation 15]}$$

In equation 15, ($x_k$, $y_k$) is coordinates with respect to the kth antenna element.

Besides, in case of having different antenna spacing, $d_k$ may be corrected to be applied to thereby configure a codebook.

A first method of devising a codebook in applying an antenna array based on the codebook configured as described above according to an exemplary embodiment of the present invention will now be described.

First, there is a codebook reconstruction method. When the base station and the mobile station share the generalized codebook generation method as represented by Equation 6 or Equation 8, a serving base station (or a serving terminal) informs the mobile station (or the base station) about the center frequency, the antenna spacing (or the antenna distance), coordinates of antenna elements, the number of antennas, an antenna type, a slant angle, and the like, and reconfigures the codebook based on them. In this case, a method fixedly used for a beam quantization and a method variably used for the beam quantization may be used. If the fixed quantization is used, the base station and the mobile station apply a fixed beam index or beam angle they know about. Meanwhile, when the variable beam quantization is applied, a suitable beam index may be applied in the following manner.

As a first method, a serving base station (or a serving mobile station) informs the mobile station (or the base station) about at least one of sectorization information and a codebook size. Thereafter, the mobile station (or the base station) determines a beam range through the received sectorization information. Also, the mobile station (or the base station) may determine a beam resolution by using the received codebook size. Thereafter, the mobile station (or the base station) performs beam quantization by using Equation 10 based on that.

As a second method, a beam set is predefined for the sectorization information or codebook size, or for the both units of information. The serving base station (or the serving mobile station) informs the mobile station (or the base station) about the index of the beam set. The mobile station (or the base station) which has received the index may configure a codebook by using the beam information regarding the corresponding index.

For example, a multi-beam set including 2 bits may be configured as shown in Table 2 below:

TABLE 2

| Index | Description |
|---|---|
| 00 | Beam set index with respect to single sector 4-bit codebook |
| 01 | Beam set index with respect to 3-sector 3-bit codebook |
| 10 | Beam set index with respect to 3-sector 4-bit codebook |
| 11 | Beam set index with respect to 6-sector 3-bit codebook |

A second method of devising a codebook in applying an antenna array based on the codebook configured as described above according to an exemplary embodiment of the present invention will now be described.

The second method is a multi-codebook method. The multi-codebook concepts discussed in several standardization groups have a very simple form and define a codebook set based on an antenna configuration or spatial correlation degree. However, the present invention proposes a method for selecting a codebook more suitable for a given environment based on detailed information in defining a codebook set. As described above, the performance of a codebook is greatly affected by the center frequency, the antenna topology, the antenna spacing, and the like.

Thus, the multi-codebook is configured with one or more of the center frequency, the antenna topology and configuration, the antenna distance, the antenna spacing or coordinates, the slant angle, the number of sectors (per cell), the codebook size, and the like.

Namely, the base station and the mobile station share a codebook set previously determined in this manner, and the serving base station (or the serving mobile station) informs about the index. Thereafter, a terminal (or a base station) which has received it can configure a codebook by using the corresponding index information.

For example, a multi-beam set including 3 bits may be configured as shown in Table 3 below:

TABLE 3

| Multi-codebook indicator | Description |
|---|---|
| 000 | Dipole ULA for 700 MHz band, Antenna Spacing 0.5, 3 sector |
| 001 | Dipole ULA for 2 MHz band, Antenna Spacing 0.5, 3 sector |
| 010 | Dipole ULA for 2 MHz band, Antenna Spacing 4, 3 sector |
| 011 | Cross-polarized ULA for 2 MHz band, Antenna Spacing 0.5, 3 sector |
| 100 | Cross-polarized ULA for 2 MHz band, Antenna Spacing 4, 3 sector |
| 101 | Dipole ULA for 3.5 MHz band, Antenna Spacing 0.5, 3 sector |
| 110 | Dipole ULA for 3.5 MHz band, Antenna Spacing 4, 3 sector |
| 111 | Dipole ULA for 6 MHz band, Antenna Spacing 0.5, 3 sector |

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method for configuring a codebook in a multi-input multi-output (MIMO) system, the method comprising:
receiving information related to a configuration of the codebook from a transmission end, wherein the information related to the configuration of the codebook comprises an antenna topology, a center frequency, an antenna spacing, an antenna distance, coordinates of antenna elements, number of antennas, an antenna type, or a slant angle; and
configuring the codebook based on the received information,
wherein the antenna topology is a uniform linear array (ULA) and the codebook applied to eight transmission antennas is:

$$CB_k = \frac{1}{\sqrt{K}}(\cos(\alpha_{tx}) + \sin(\alpha_{tx})\cos(\theta_i))e^{j2\pi f_c(k-1)\Delta d \sin(\theta_i)/C}$$

where,
$f_c$: center frequency (Hz)
k: antenna index (k=1, . . . , K)
$\Delta d$: antenna spacing (meters)
(if a cross-polarization antenna is adopted, the spacing means distance between different antenna spots)
$\alpha_{tx}$: antenna slant angle (e.g. 0°, 45°, −45°, 90°)
$\theta_i$: quantized angle in beam domain (i: selected beam index).

2. The method of claim 1, wherein the antenna type is classified into a dipole antenna, a patch array antenna, and a dual polarized antenna.

3. The method of claim 1, wherein a rank 1 codebook matrix with respect to the codebook applied to the eight transmission antennas is:

$$8Tx \text{ Rank1 Codebook } V8(:,j,3) = \frac{1}{\sqrt{K}}\begin{bmatrix} 1 \\ (\cos(\alpha_{tx}) + \sin(\alpha_{tx})\cos(\theta_i))e^{j2\pi\Delta d\sin(\theta_i)} \\ (\cos(\alpha_{tx}) + \sin(\alpha_{tx})\cos(\theta_i))e^{j4\pi\Delta d\sin(\theta_i)} \\ (\cos(\alpha_{tx}) + \sin(\alpha_{tx})\cos(\theta_i))e^{j6\pi\Delta d\sin(\theta_i)} \\ (\cos(\alpha_{tx}) + \sin(\alpha_{tx})\cos(\theta_i))e^{j8\pi\Delta d\sin(\theta_i)} \\ (\cos(\alpha_{tx}) + \sin(\alpha_{tx})\cos(\theta_i))e^{j10\pi\Delta d\sin(\theta_i)} \\ (\cos(\alpha_{tx}) + \sin(\alpha_{tx})\cos(\theta_i))e^{j12\pi\Delta d\sin(\theta_i)} \\ (\cos(\alpha_{tx}) + \sin(\alpha_{tx})\cos(\theta_i))e^{j14\pi\Delta d\sin(\theta_i)} \end{bmatrix}$$

* * * * *